United States Patent
Verdier

(10) Patent No.: US 11,703,103 B2
(45) Date of Patent: Jul. 18, 2023

(54) TORQUE CONVERTER DAMPER ASSEMBLY

(71) Applicant: Schaeffler Technologies AG & Co. KG, Herzogenaurach (DE)

(72) Inventor: Joshua Verdier, Lodi, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/870,922

(22) Filed: Jul. 22, 2022

(65) Prior Publication Data

US 2023/0069143 A1 Mar. 2, 2023

Related U.S. Application Data

(60) Provisional application No. 63/240,347, filed on Sep. 2, 2021.

(51) Int. Cl.
*F16F 15/123* (2006.01)
*F16H 45/02* (2006.01)

(52) U.S. Cl.
CPC .... *F16F 15/12366* (2013.01); *F16F 15/1234* (2013.01); *F16H 2045/0231* (2013.01); *F16H 2045/0294* (2013.01)

(58) Field of Classification Search
CPC .... F16H 45/02; F16H 2045/0273–0294; F16F 15/12366
See application file for complete search history.

(56) References Cited

U.S. PATENT DOCUMENTS

| | | | |
|---|---|---|---|
| 7,073,646 B2 * | 7/2006 | Sasse | F16F 15/12366 192/213.1 |
| 7,172,509 B2 * | 2/2007 | Yamamoto | F16F 15/12366 464/68.8 |
| 7,267,211 B2 * | 9/2007 | Yamashita | F16H 45/02 192/109 R |
| 7,866,454 B2 * | 1/2011 | Saka | F16H 45/02 192/3.3 |
| 8,047,345 B2 * | 11/2011 | Degler | F16H 45/02 192/3.29 |
| 8,135,525 B2 | 3/2012 | Swank et al. | |
| 8,152,646 B2 | 4/2012 | Jameson et al. | |
| 8,727,086 B2 * | 5/2014 | Kneidel | F16H 45/02 192/213.22 |
| 9,004,248 B2 * | 4/2015 | Kawahara | F16F 15/1397 192/3.29 |

(Continued)

FOREIGN PATENT DOCUMENTS

| | | | |
|---|---|---|---|
| DE | 102014207229 A1 * | 11/2014 | F16F 15/145 |
| DE | 102018115904 A1 * | 2/2019 | |

(Continued)

*Primary Examiner* — Ernesto A Suarez
*Assistant Examiner* — James J Taylor, II

(57) ABSTRACT

A torque converter includes a front cover arranged to receive a torque and a lock-up clutch engaged with the front cover. The torque converter further includes a damper assembly engageable with the lock-up clutch. The damper assembly includes an inner spring assembly, an outer spring assembly arranged radially outside of the inner spring assembly, and a lower cover plate supporting the inner spring assembly. The lower cover plat includes a chamfer configured to retain the outer spring assembly in a spring window.

19 Claims, 1 Drawing Sheet

(56) References Cited

U.S. PATENT DOCUMENTS

| | | | |
|---|---|---|---|
| 9,303,747 B2 * | 4/2016 | Mototsune | F16D 25/0635 |
| 10,253,842 B2 * | 4/2019 | Okaji | F16F 15/12366 |
| 2011/0195795 A1 | 8/2011 | Murata et al. | |
| 2012/0151908 A1 * | 6/2012 | Vanni | F16H 45/02 60/364 |
| 2015/0354684 A1 | 12/2015 | Lee et al. | |

FOREIGN PATENT DOCUMENTS

| | | | |
|---|---|---|---|
| EP | 0110553 A1 | 6/1984 | |
| WO | WO-2007065393 A1 * | 6/2007 | F16F 15/1234 |

\* cited by examiner

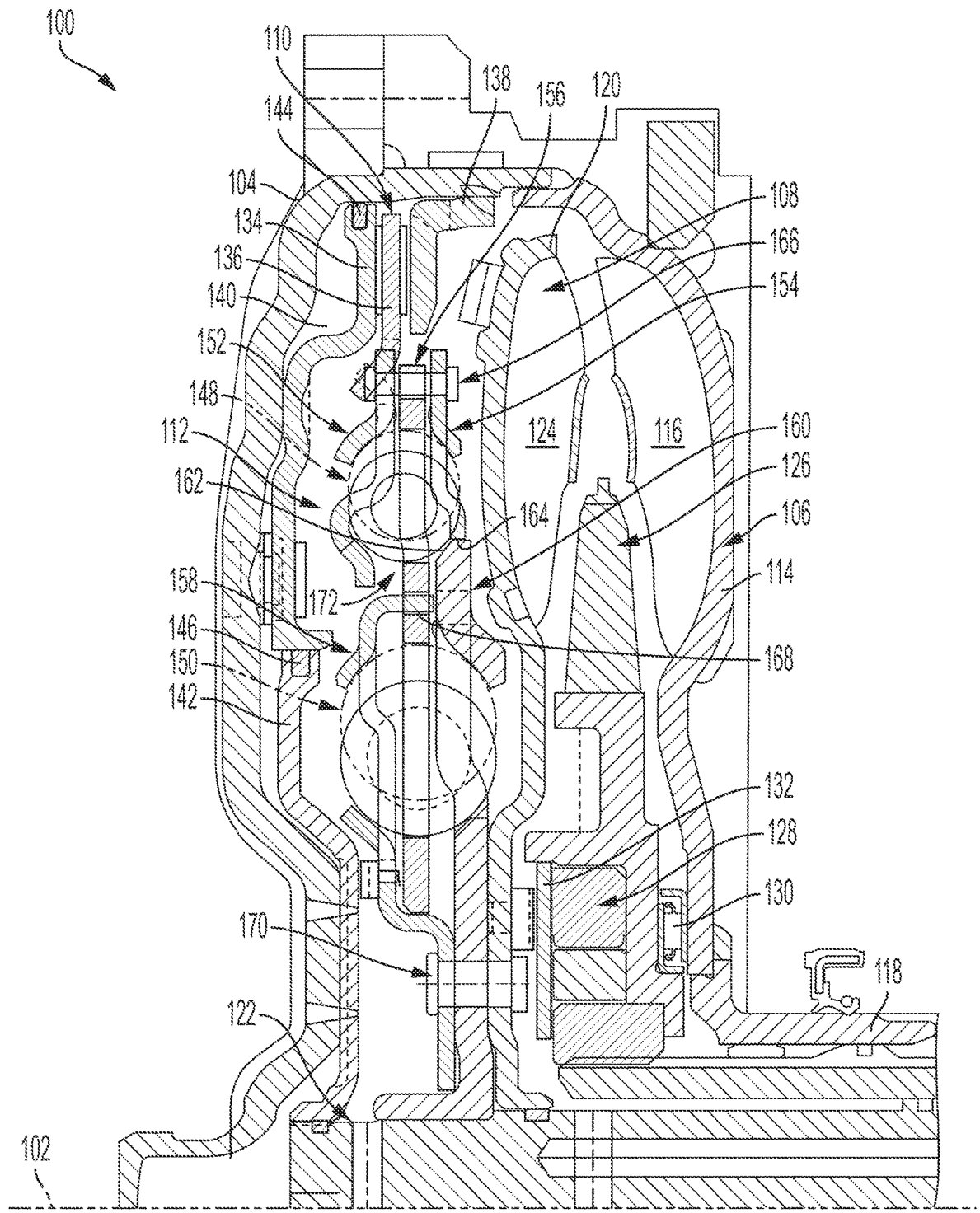

TORQUE CONVERTER DAMPER ASSEMBLY

CROSS-REFERENCE TO RELATED APPLICATIONS

This application claims the benefit of U.S. Provisional Patent Application No. 63/240,347, filed Sep. 2, 2021, the disclosure of which is incorporated in its entirety by reference herein.

TECHNICAL FIELD

The present disclosure relates to a torque converter for a vehicle. In particular, the present disclosure relates to a damper assembly for a torque converter.

BACKGROUND

Many vehicles include a launch device between the engine and the transmission. A torque converter is a type of launch device commonly used in vehicles having an automatic transmission. A typical torque converter includes an impeller fixed to the crankshaft of the engine and a turbine fixed to a turbine shaft, which is the input to the transmission. To improve fuel economy, most torque converters include a bypass or lock-up clutch that mechanically couples the turbine shaft to a cover of the torque converter to bypass the fluid coupling. Due to limited spacing within a torque converter envelope, it is desirable to have alternative designs and configurations to fit all the necessary components within the torque converter including the damper assembly. Moreover, as envelope spacing and packaging become more limited, issues may arise with manufacturing various components to meet these reduced tolerances.

SUMMARY

In one embodiment, a torque converter includes a front cover arranged to receive a torque. The torque converter further includes an impeller having an impeller shell non-rotatably connected to the front cover. The torque converter further includes a turbine in fluid communication with the impeller and includes a turbine shell. The torque converter further includes a lock-up clutch including a piston and a clutch plate. The torque converter further includes a damper assembly disposed axially between the front cover and the turbine shell and engageable with the clutch plate. The damper assembly includes an inner spring assembly, an outer spring assembly arranged radially outside of the inner spring assembly, and a lower cover plate supporting the inner spring assembly. The lower cover plate includes a chamfer configured to retain the outer spring assembly in a spring window.

In embodiments, the torque converter may include an upper cover plate supporting the outer spring assembly. The lower cover plate may include a flat region configured to radially retain the upper cover plate. The flat region may be located on an outer diameter of the lower cover plate. The chamfer may extend radially inward from the flat region. In embodiments, the torque converter may include a further upper cover plate disposed axially between the piston and the upper cover plate. The further upper cover plate may support the outer spring assembly. The further upper cover plate may be connected to the upper cover plate. The further upper cover plate may be connected to the clutch plate. The upper cover plate and the further upper cover plate may define the spring window. In embodiments, the torque converter may include an intermediate flange disposed axially between the upper cover plate and the further upper cover plate. The intermediate flange may be connected to the upper cover plate and the further upper cover plate. The intermediate flange may be configured to transfer the torque to the inner spring assembly based on the torque exceeding a first threshold. In embodiments, the torque converter may include a further lower cover plate disposed axially between the front cover and the lower cover plate. The further lower cover plate may support the inner spring assembly. The further lower cover plate may be connected to the lower cover plate. The further lower cover plate may be configured to transfer the torque to the lower cover plate based on the torque exceeding a second threshold. The further lower cover plate may be connected to the intermediate flange.

In embodiments, the lower cover plate may be connected to the turbine shell. The lower cover plate may be arranged to non-rotatably connect to a transmission input shaft. The chamfer may extend from an axial side of the lower cover plate towards an outer diameter of the lower cover plate.

In another embodiment, a damper assembly for a torque converter includes an inner spring assembly, an outer spring assembly arranged radially outside of the inner spring assembly, and a lower cover plate supporting the inner spring assembly. The lower cover plate includes a chamfer configured to retain the outer spring assembly in a spring window.

In embodiments, the damper assembly may include an upper cover plate supporting the outer spring assembly. The lower cover plate may include a flat region configured to radially retain the upper cover plate. The flat region may be located on an outer diameter of the lower cover plate. In embodiments, the damper assembly may include a further upper cover plate connected to the upper cover plate. The further upper cover plate may support the outer spring assembly. The upper cover plate and the further upper cover plate may define the spring window. In embodiments, the damper assembly may include an intermediate flange disposed axially between the upper cover plate and the further upper cover plate. The intermediate flange may be connected to the upper cover plate and the further upper cover plate. The intermediate flange may be configured to transfer the torque to the inner spring assembly based on the torque exceeding a first threshold. The damper assembly may include a further lower cover plate connected to the lower cover plate and the intermediate flange. The further lower cover plate may support the inner spring assembly and may be configured to transfer the torque to the lower cover plate based on the torque exceeding a second threshold.

Embodiments described herein include advantageous configurations that include moving the inner spring assembly retention feature for a damper's upper or outer spring assembly to the lower cover plate associated with the damper's lower or inner spring assembly to allow for packaging of the damper assembly in smaller envelopes.

BRIEF DESCRIPTION OF THE DRAWINGS

The single FIGURE is a cross-sectional view of a torque converter having a damper assembly according to the present disclosure.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the FIGURES can be combined with features illustrated in one or more other FIGURES to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Referring to the single FIGURE, a portion of torque converter 100 is illustrated according to one embodiment of the present disclosure. At least some portions of torque converter 100 are rotatable about central axis 102. While only a portion of torque converter 100 above central axis 102 is shown in FIG. 1, it should be understood that torque converter 100 can appear substantially similar below central axis 102 with many components extending about central axis 102. Words such as "axial," "radial," "circumferential," "outward," etc. as used herein are intended to be with respect to central axis 102.

Torque converter 100 includes: front cover 104 arranged to receive torque; impeller 106; turbine 108; lock-up clutch 110; and damper assembly 112. Impeller 106 includes: impeller shell 114 non-rotatably connected to front cover 104 such that impeller 106 rotates as front cover 104 rotates, at least one impeller blade 116 attached to an inner surface of the impeller shell 114, and impeller hub 118 attached to a radially inner end of impeller shell 114. Turbine 108 includes turbine shell 120 non-rotatably connected to transmission input shaft 122 and at least one turbine blade 124 attached to the turbine shell 120. By "non-rotatably connected" components, we mean that: the components are connected so that whenever one of the components rotate, all the components rotate; and relative rotation between the components is not possible. Radial and/or axial movement of non-rotatably connected components with respect to each other is possible, but not required.

Torque converter 100 may include: stator 126 disposed axially between impeller 106 and turbine 108 to redirect fluid flowing from turbine blade 124 before the fluid reaches impeller 106 to increase an efficiency of torque converter 100. For example, impeller blade 116, when rotated about central axis 102, pushes the fluid outwardly. The fluid pushes against turbine 108 of torque converter 100, causing turbine 108 to revolve about central axis 102. Stator 126 functions to return the fluid from turbine 108 back to impeller 106 with minimal or no power loss. Drive power is transmitted from turbine 108 to transmission input shaft 122. Torque converter 100 may, for example, further include: one-way clutch 128 disposed within stator 126, thrust bearing 130 disposed axially between stator 126 and impeller shell 114, and side plate 132 configured to retain the one-way clutch 128 within the stator 126.

Power from a vehicle engine (not shown) can be transmitted to a transmission (not shown) via fluid, and via torque converter 100. In particular, the power may first be transmitted to front cover 104 of torque converter 100. Lock-up clutch 110 is configured to selectively transfer torque from front cover 104 to transmission input shaft 122. Lock-up clutch 110 includes piston 134, clutch plate 136, and reaction plate 138.

Piston 134 may be connected to front cover 104 via a leaf-spring connection and sealed to front cover 104 at an outer diameter thereof. Reaction plate 138 may be fixed to front cover 104 via a weld, for example. Clutch plate 136 may be disposed between piston 134 and reaction plate 138.

Piston 134 engages or closes the lock-up clutch 110 in response to the pressurization of a medium (e.g., fluid such as oil) in piston apply chamber 140 defined between front cover 104 and piston 134. During axial movement of piston 134, piston 134 slides along seal plate 142 that is non-rotatably fixed to front cover 104, e.g., via welds, and sealed to a transmission input shaft at an inner diameter thereof. Piston 134 is sealed at an outer diameter to front cover 104 via seal 144 and sealed at an inner diameter to seal plate 142 via seal 146. Seals 144, 146 maintain a fluid separation between piston apply chamber 140 and the rest of torque converter 100. Piston apply chamber 140 is further defined by, or bounded between, front cover 104, seal 144, piston 134, seal 146, and seal plate 142. By "bounded in part," we mean that a portion of the cited chamber, flow path, or other structure is bounded, or formed, by the cited element.

Damper assembly 112 is positioned axially between front cover 104 and turbine 108. Damper assembly 112 can be configured to hydraulically transfer torque through torque converter 100. For example, damper assembly 112 can be configured to transfer torque from front cover 104 to transmission input shaft 122. Damper assembly 112 includes: outer spring assembly 148; inner spring assembly 150 radially inward of outer spring assembly 148; cover plates 152, 154 supporting outer spring assembly 148; intermediate flange 156; and cover plates 158, 160 supporting inner spring assembly 150. Cover plate 152 is disposed between front cover 104 and intermediate flange 156 and connected to clutch plate 136, for example, via a tabbed connection for transfer of torque from lock-up clutch 110 to damper assembly 112. Cover plate 154 is disposed between intermediate flange 156 and turbine shell 120.

Cover plate 160 includes chamfer 162 configured and arranged to keep or retain outer spring assembly 148 in respective spring windows 172, i.e., predefined areas of operation for the outer spring assembly 148. The spring windows 172 are defined, i.e., bounded, by cover plates 152, 154. Chamfer 162 may be referred to as a "spinning eyebrow." That is, chamfer 162 may rotate independently of, i.e., relative to, the outer spring assembly 148. Chamfer 162 may be formed at an angle corresponding to a desired positioning of outer spring assembly 148 and formed in the outer diameter of cover plate 160. Chamfer 162 may be a coined or machined chamfer.

Cover plate 160 includes flat region 164 adjacent to chamfer 162. Flat region 164 is configured and arranged to provide radial retention of cover plate 154. An inner diameter of cover plate 160 may further be configured and arranged to couple with transmission input shaft 122, for example, via a bubbled feature with a broached spline that interfaces with transmission input shaft 122. Torque converter 100 may further include a thrust washer (not numbered) disposed between cover plate 158 and seal plate 142 and retained by cover plate 152.

Torque converter 100 further includes a torque path described as follows: when lock-up clutch 110 is engaged (or closed such that piston 134 presses clutch plate 136 against reaction plate 138) to transmit torque from front cover 104 to cover plate 152 via, for example, a tabbed connection with clutch plate 136. The torque is then distributed to outer spring assembly 148, cover plate 154 by connector 166 (e.g., a sheet metal rivet connection), and torques that exceed the spring capacity of outer spring assembly 148 are transmitted through connector 166 to intermediate flange 156. Torque from intermediate flange 156 is then input into inner spring assembly 150, and any torques exceeding the spring capacity of inner spring assembly 150 are transmitted into tab feature 168 on cover plate 158. The torque received into cover plate 160 comes from connector (e.g., a sheet metal rivet connection) 170 to cover plate 158 and from inner spring assembly 150 and interfaces with transmission input shaft 122.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS

100 Torque converter
102 Central axis
104 Front cover
106 Impeller
108 Turbine
110 Lock-up clutch
112 Damper assembly
114 Impeller shell
116 Impeller blade
118 Impeller hub
120 Turbine shell
122 Transmission input shaft
124 Turbine blade
126 Stator
128 One-way clutch
130 Thrust bearing
132 Side plate
134 Piston
136 Clutch plate
138 Reaction plate
140 Piston apply chamber
142 Seal plate
144 Seal
146 Seal
148 Outer spring assembly
150 Inner spring assembly
152 Cover plate
154 Cover plate
156 Intermediate flange
158 Cover plate
160 Cover plate
162 Chamfer
164 Flat region
166 Connector
168 Tab feature
170 Connector
172 Spring window

What is claimed is:

1. A torque converter comprising:
a front cover arranged to receive a torque;
an impeller having an impeller shell non-rotatably connected to the front cover;
a turbine in fluid communication with the impeller and including a turbine shell;
a lock-up clutch including a piston and a clutch plate; and
a damper assembly disposed axially between the front cover and the turbine shell and engageable with the clutch plate, the damper assembly including:
an inner spring assembly and an outer spring assembly arranged radially outside of the inner spring assembly; and
a lower cover plate supporting the inner spring assembly and being non-rotatably connected to the turbine shell radially inside of the inner spring assembly, the lower cover plate including a chamfer configured to retain the outer spring assembly in a spring window, and further comprising an upper cover plate supporting the outer spring assembly, the lower cover plate including a flat region in contact with a radially inner end of the upper cover plate, wherein the lower cover plate is rotatable relative to the upper cover plate.

2. The torque converter of claim 1, wherein the flat region is located on an outer diameter of the lower cover plate.

3. The torque converter of claim 1, wherein the chamfer extends radially inward from the flat region.

4. The torque converter of claim 1, further comprising a further upper cover plate disposed axially between the piston and the upper cover plate, the further upper cover plate supporting the outer spring assembly, wherein the further upper cover plate is connected to the upper cover plate.

5. The torque converter of claim 4, wherein the further upper cover plate is connected to the clutch plate.

6. The torque converter of claim 4, further comprising an intermediate flange disposed axially between the upper cover plate and the further upper cover plate, the intermediate flange being connected to the upper cover plate and the further upper cover plate, wherein the intermediate flange is configured to transfer the torque to the inner spring assembly based on the torque exceeding a first threshold.

7. The torque converter of claim 6, further comprising a further lower cover plate disposed axially between the front cover and the lower cover plate, the further lower cover plate supporting the inner spring assembly, wherein the further lower cover plate is connected to the lower cover plate.

8. The torque converter of claim 7, wherein the further lower cover plate is configured to transfer the torque to the lower cover plate based on the torque exceeding a second threshold.

9. The torque converter of claim 7, wherein the further lower cover plate is connected to the intermediate flange radially between the inner spring assembly and the outer spring assembly.

10. The torque converter of claim 7, wherein the further lower cover plate is radially spaced from the further upper cover plate.

11. The torque converter of claim 7, wherein:
the further lower cover plate is connected to the lower cover plate via a rivet arranged radially inside of the inner spring assembly; and
the intermediate flange is connected to each of the upper cover plate and the further upper cover plate via a further rivet arranged radially outside of the outer spring assembly.

12. The torque converter of claim 1, further comprising a transmission input shaft, wherein the lower cover plate is non-rotatably connected to the transmission input shaft.

13. The torque converter of claim 1, wherein the chamfer extends from an axial side of the lower cover plate towards an outer diameter of the lower cover plate.

14. A damper assembly for a torque converter comprising:
an inner spring assembly and an outer spring assembly arranged radially outside of the inner spring assembly; and
a lower cover plate supporting the inner spring assembly, the lower cover plate including a chamfer configured to retain the outer spring assembly in a spring window, and
an upper cover plate supporting the outer spring assembly, the lower cover plate including a flat region in contact with a radially inner end of the upper cover plate, wherein the lower cover plate is rotatable relative to the upper cover plate.

15. The damper assembly of claim 14, further comprising a further upper cover plate connected to the upper cover plate, the further upper cover plate supporting the outer spring assembly.

16. The damper assembly of claim 15, further comprising an intermediate flange disposed axially between the upper cover plate and the further upper cover plate, the intermediate flange being connected to the upper cover plate and the further upper cover plate, wherein the intermediate flange is configured to transfer a torque to the inner spring assembly based on the torque exceeding a first threshold.

17. The damper assembly of claim 16, further comprising a further lower cover plate connected to the lower cover plate and the intermediate flange, the further lower cover plate supporting the inner spring assembly configured to transfer the torque to the lower cover plate based on the torque exceeding a second threshold.

18. The damper assembly of claim 15, wherein the upper cover plate and the further upper cover plate define at least a portion of the spring window.

19. A torque converter comprising:
a front cover arranged to receive a torque;
an impeller having an impeller shell non-rotatably connected to the front cover;
a turbine in fluid communication with the impeller and including a turbine shell;
a lock-up clutch including a piston and a clutch plate; and
a damper assembly disposed axially between the front cover and the turbine shell and engageable with the clutch plate, the damper assembly including:
an inner spring assembly and an outer spring assembly arranged radially outside of the inner spring assembly;
a lower cover plate supporting the inner spring assembly, the lower cover plate including a chamfer configured to retain the outer spring assembly in a spring window;
an upper cover plate supporting the outer spring assembly, the lower cover plate including a flat region configured to radially retain the upper cover plate;
a further upper cover plate disposed axially between the piston and the upper cover plate, the further upper cover plate supporting the outer spring assembly, wherein the further upper cover plate is connected to the upper cover plate;
an intermediate flange disposed axially between the upper cover plate and the further upper cover plate, the intermediate flange being connected to the upper cover plate and the further upper cover plate, wherein the intermediate flange is configured to transfer the torque to the inner spring assembly based on the torque exceeding a first threshold; and
a further lower cover plate connected to the lower cover plate and disposed axially between the front cover and the lower cover plate, the further lower cover plate supporting the inner spring assembly, wherein the further lower cover plate is configured to transfer the torque to the lower cover plate based on the torque exceeding a second threshold.

* * * * *